United States Patent
Sivasubramanian et al.

(10) Patent No.: US 11,543,983 B2
(45) Date of Patent: *Jan. 3, 2023

(54) SYSTEM AND METHOD FOR PROVIDING ENHANCEMENTS OF BLOCK-LEVEL STORAGE

(71) Applicant: Amazon Technologies, Inc., Reno, NV (US)

(72) Inventors: Swaminathan Sivasubramanian, Seattle, WA (US); Brad E. Marshall, Bainbridge Island, WA (US); Tate Andrew Certain, Seattle, WA (US); Nicholas J. Maniscalco, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1389 days.

This patent is subject to a terminal disclaimer.

(21) Appl. No.: 14/231,128

(22) Filed: Mar. 31, 2014

(65) Prior Publication Data

US 2014/0215227 A1 Jul. 31, 2014

Related U.S. Application Data

(63) Continuation of application No. 12/892,742, filed on Sep. 28, 2010, now Pat. No. 8,688,660.

(51) Int. Cl.
*G06F 3/06* (2006.01)
*G06F 9/455* (2018.01)
*G06F 12/14* (2006.01)

(52) U.S. Cl.
CPC .............. *G06F 3/064* (2013.01); *G06F 3/061* (2013.01); *G06F 3/065* (2013.01); *G06F 3/067* (2013.01);

(Continued)

(58) Field of Classification Search
CPC .............. G06F 17/30008; G06F 9/466; G06F 17/30286; G06F 17/30575;

(Continued)

(56) References Cited

U.S. PATENT DOCUMENTS 5,574,878 A 11/1996 Onodera et al.
6,029,166 A * 2/2000 Mutalik ................ G06F 3/0619

(Continued)

FOREIGN PATENT DOCUMENTS

WO 2011088261 7/2011

OTHER PUBLICATIONS

VMware; Carl Waldspurger; Memory Resource Management in WMware ESX Server; pp. 1-24, Dec. 10, 2002.

(Continued)

*Primary Examiner* — Cam Y T Truong
(74) *Attorney, Agent, or Firm* — Robert C. Kowert; Kowert, Hood, Munyon, Rankin & Goetzel, P.C.

(57) ABSTRACT

A block storage service provides block-level storage to a plurality of distinct computing instances for a plurality of distinct users. For each of one or more of the plurality of distinct computing instances, information about data being stored in the block storage service is determined. Based on the information about the data being stored in the block storage service, a block storage transaction enhancement for the data being stored in the block storage service is determined. The block storage service performs the selected block storage transaction enhancement with respect to the data being stored in the block storage service.

18 Claims, 11 Drawing Sheets

(52) U.S. Cl.
CPC ........ *G06F 3/0619* (2013.01); *G06F 9/45558* (2013.01); *G06F 12/1408* (2013.01); *G06F 2009/45579* (2013.01)

(58) Field of Classification Search
CPC ............... G06F 17/30377; G06F 3/064; G06F 9/45558; G06F 3/061; G06F 3/0619; G06F 3/065; G06F 12/1408; G06F 3/067; G06F 2009/45579
See application file for complete search history.

(56) References Cited

U.S. PATENT DOCUMENTS

| | | | | |
|---|---|---|---|---|
| 6,108,638 A * | 8/2000 | Sato | ................. | G07G 1/14 235/383 |
| 6,654,756 B1 * | 11/2003 | Quernemoen | .......... | G06F 16/22 |
| 7,113,984 B1 * | 9/2006 | Wallace | ................. | G06F 17/30 370/466 |
| 7,386,757 B2 * | 6/2008 | Lindenstruth | ....... | G06F 11/1076 714/6.1 |
| 7,685,164 B2 * | 3/2010 | Stakutis | .............. | G06F 16/1734 707/999.107 |
| 7,827,286 B1 * | 11/2010 | Deflaux | ................ | G06F 17/302 709/215 |
| 7,937,367 B2 * | 5/2011 | Watanabe | ........... | G06F 11/1471 707/640 |
| 8,190,832 B2 * | 5/2012 | Dickey | ................... | G06F 3/061 711/156 |
| 8,280,853 B1 | 10/2012 | Lai et al. | | |
| 8,285,687 B2 * | 10/2012 | Voll | ..................... | G06F 3/0608 707/687 |
| 9,569,123 B2 * | 2/2017 | DeSantis | ............. | G06F 11/1464 |
| 2002/0059253 A1 | 5/2002 | Albazz et al. | | |
| 2002/0078239 A1 * | 6/2002 | Howard | ........... | G06F 17/30094 709/245 |
| 2002/0099843 A1 * | 7/2002 | Fruchtman | .............. | H04L 29/06 709/232 |
| 2006/0149899 A1 * | 7/2006 | Zimmer | ................ | G06F 3/0607 711/112 |
| 2007/0239793 A1 * | 10/2007 | Tyrrell | .................... | G06F 16/10 |
| 2007/0266037 A1 * | 11/2007 | Terry | .................... | G06F 3/0607 |
| 2008/0077762 A1 * | 3/2008 | Scott | ................... | G06F 16/1724 711/170 |
| 2008/0109444 A1 * | 5/2008 | Williams | ................ | G06Q 30/02 |
| 2008/0126680 A1 * | 5/2008 | Lee | ......................... | G06F 3/064 711/E12.001 |
| 2008/0140905 A1 | 6/2008 | Okuyama et al. | | |
| 2008/0162591 A1 * | 7/2008 | Ganotra | .............. | G06F 11/1474 |
| 2009/0040650 A1 * | 2/2009 | Bates | ................... | G06F 11/0727 360/75 |
| 2009/0228889 A1 | 9/2009 | Yoshida | | |
| 2009/0249470 A1 | 10/2009 | Litvin et al. | | |
| 2010/0037009 A1 | 2/2010 | Yano et al. | | |
| 2010/0070725 A1 * | 3/2010 | Prahlad | ............... | G06F 11/1453 711/162 |
| 2010/0169780 A1 * | 7/2010 | Bryant-Rich | ........ | G11B 27/105 715/719 |
| 2010/0191779 A1 * | 7/2010 | Hinrichs | ................ | G06F 3/0689 707/822 |
| 2010/0191922 A1 * | 7/2010 | Dickey | ................... | G06F 3/061 711/154 |
| 2010/0299489 A1 * | 11/2010 | Balachandriah | .... | G06F 11/3442 711/162 |
| 2010/0306267 A1 * | 12/2010 | Zamkoff | ............. | G06F 11/1456 707/783 |
| 2010/0312983 A1 * | 12/2010 | Moon | ..................... | G06F 3/061 711/170 |

OTHER PUBLICATIONS

HP; Chris Hyser et al.; Autonomic Virtual Machine Placement in the Data Center; pp. 1-10, Feb. 26, 2008; HP Laboratories.

U.S. Appl. No. 12/892,742, filed Sep. 28, 2010, Swaminathan Sivasubramanian.

\* cited by examiner

SYSTEM AND METHOD FOR PROVIDING ENHANCEMENTS OF BLOCK-LEVEL STORAGE

This application is a continuation of U.S. application Ser. No. 12/892,742, filed Sep. 28, 2010, now U.S. Pat. No. 8,688,660, which is hereby incorporated by reference in its entirety.

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-level storage. Such block-level storage provides a storage system that is able to interact with various computing virtualizations through a series of standardized storage calls that render the block-level storage functionally agnostic to the structural and functional details of the volumes that it supports and the operating systems executing on the virtualizations to which it provides storage availability.

Unfortunately, the paradigm of block-level storage that is functionally agnostic to the structural and functional details of various virtualizations forces enhancements of the storage to be performed, if at all, at the level of the virtualization, rather than at the level of the storage. Performance of storage enhancements at the virtualization frequently involves prohibitive inefficiencies, such as transmission and retransmission of data across a network, which increase the cost and delay associated with some enhancements and result in the decision not to undertake others. The user is left with overall storage performance that, lacking enhancements at the level of the storage itself, produces a negative impact on the efficiency of the virtualized computing supported by the storage.

Figure 1:
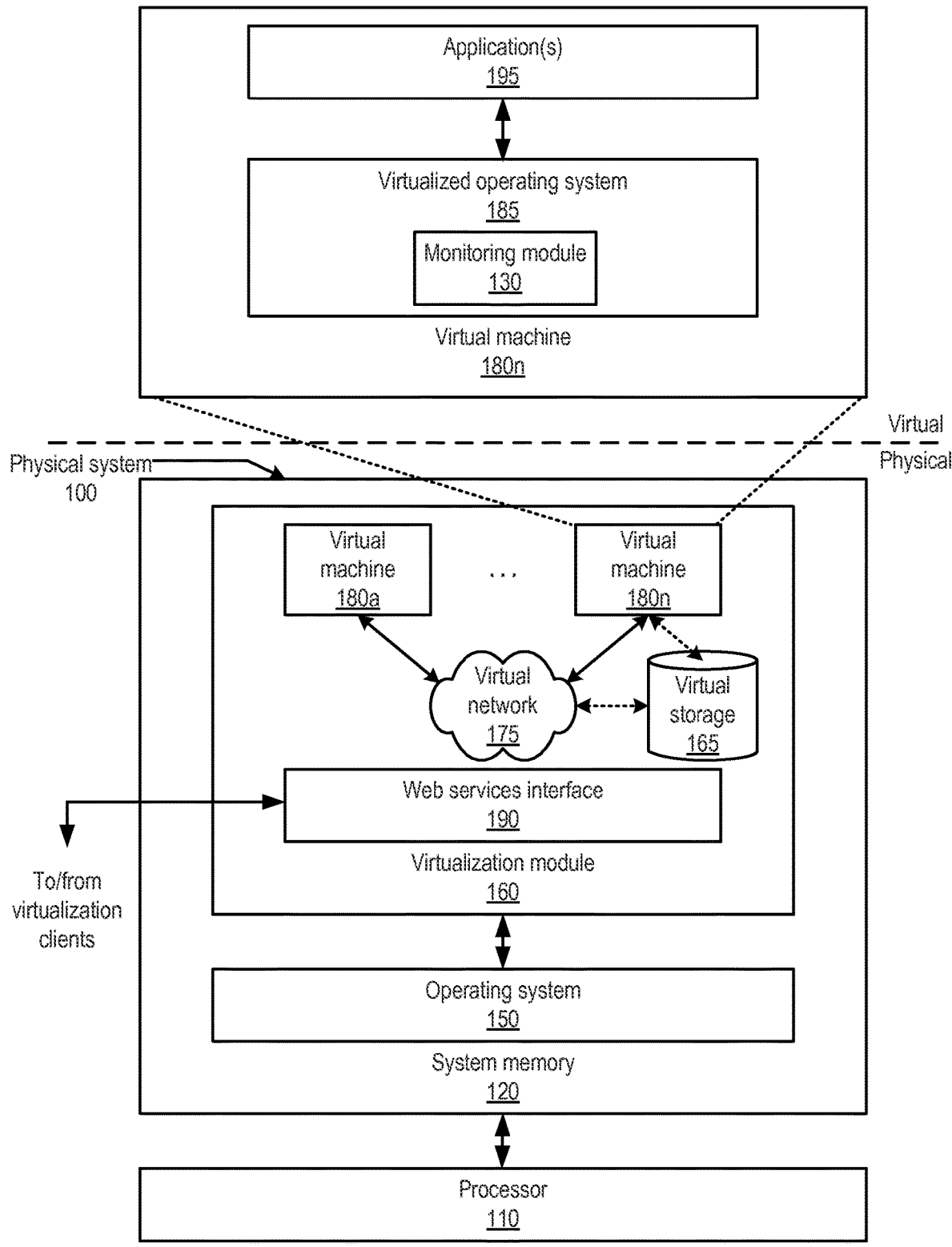
FIG. 1 illustrates an example embodiment of a system that may be configured to implement virtualized computing.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In an environment providing on-demand storage associated with a cloud computing service or other virtualized computing, a block storage service provides block-level storage to a set of distinct computing instances for a set of distinct users.

Embodiments provide a block storage transaction enhancement function for selecting block storage transaction enhancements applicable by the block storage service to data stored by the block storage service as blocks in the block-level storage. Block storage transaction enhancements are selected based on information about the data stored by the block storage service. The information can, in some embodiments, include or be based on volume formats of the volumes or formats of other data structures, such as database tables, stored in the block storage service. The information can, in some embodiments, also include or be based on content of block data transaction instructions received by the block storage service. The block storage transaction enhancement function also performs the block storage transaction enhancements with respect to the data stored by the block storage service. As used herein, the term block storage enhancement or block storage transaction enhancement includes both optimizations and features that improve the execution or operation of data storage or retrieval.

Embodiments thus help to alleviate the difficulties previously associated with the inability to provide various storage enhancements with respect to data stored as blocks in block-level storage. In some embodiments, the block storage service receives a configuration request from a user indicating a format or a purpose of a volume or other grouping of data stored as blocks in the block storage service that is associated with a virtualized computing instance. The configuration request may be received at the time of creation of the data structure in the block-level storage or at a subsequent time. The configuration requests may be received through a user interface such as a web services interface. The configuration requests may be modified.

The block storage service receives block data transaction instructions from the virtualized computing instance. The block data transaction instructions are directed to volumes or other groupings of data stored as blocks in the block storage service that are associated with the virtualized computing instances.

A block storage transaction enhancement for the data in the block storage service that is associated with the virtualized computing instance is selected by analyzing the information about the data. The block storage transaction is performed with respect to the data stored as blocks in the block storage service. Embodiments thereby provide storage enhancements on the block storage service that could not be otherwise provided at an equivalent cost efficiency. Examples of such enhancements include optimizations such as object placement, replication, and caching. Examples of such enhancements also include features such as defragmentation for contiguous read transactions, encryption, and compression, among others. While certain examples of block storage transaction enhancements are explained through the following text and accompanying drawings, one skilled in the art will realize, in light of the present disclosure, that other enhancements not discussed herein are likewise included within the scope of certain embodiments.

Overview of Virtualized Computing

Generally speaking, virtualized computing (which may also be referred to as virtual computing or virtualization) may refer to techniques for configuring a physical computer system so that it appears, from a software perspective, to behave like multiple independent "virtual" computer systems. Virtualized computing may be distinguished from a conventional multitasking operating system (OS). A typical OS may provide a number of protected memory spaces in which different processes may execute without interfering with one another, as well as a common set of privileged routines to manage execution of those processes and coordinate access to system resources. By contrast, virtualized computing techniques may be employed to configure multiple virtual machines, each of which may execute its own operating system, which may be different for different virtual machines. Access to these machines may then be distributed to different users over a network.

By decoupling the configuration and operation of a virtual machine from the underlying physical hardware on which the virtual machine executes, virtualized computing may enable a user to configure a virtual machine according to a defined set of specifications, and to recreate the previously configured virtual machine at a later time, all without altering the configuration of the underlying physical hardware or the storage to which the virtual machine attaches.

An example of a system that may be configured to implement virtualized computing is illustrated in FIG. 1. In the illustrated embodiment, physical system 100 includes a processor 110 coupled to a system memory 120. For example, processor 110 may correspond to any type of microprocessor configured to execute instructions defined by a particular instruction set architecture (ISA), such as the x86/x64 ISA, the PowerPC™ ISA, the SPARC™ ISA, the ARM™ ISA, or any other suitable ISA. System memory 120 may correspond to any type of storage device configured to store data and instructions executable by processor 110. For example, system memory 120 may include any of various types of random access memory (RAM), read-only memory (ROM), non-volatile memory (e.g., flash memory), magnetic memory, or any other suitable type of memory.

System memory 120 may be configured to store instructions and data that, when executed by processor 110 or another processor, are configured to implement an operating system 150 and virtualization module 160. Generally speaking, operating system 150 may correspond to any suitable type of operating system, such as a version of Microsoft Windows™, Apple MacOS™, Unix, Linux, or another operating system. Typically, operating system 150 may be configured to serve as an interface between applications and the resources provided by the computer system, such as memory, mass storage devices, communications devices, system services, and the like.

Virtualization module 160 may be configured to implement an environment within which multiple different virtual machines may operate. Virtualization module 160 may also be referred to as a hypervisor or a virtual machine monitor. In the illustrated embodiment, virtualization module 160 may be implemented as a distinct layer of software from operating system 150, a configuration that may be referred to as a "hosted hypervisor." In other embodiments, rather than running in a distinct layer, virtualization module 160 may be integrated with operating system 150 in a configuration that may be referred to as a "native hypervisor." Some examples of hosted-hypervisor implementations of virtualization module 160 may include VMware ESX/ESXi™, VMware Fusion™, Microsoft Virtual PC™, VirtualBox™, and Parallels Desktop™ Some examples of native-hypervisor implementations may include Xen, VMware Infrastructure™, Logical Domains Hypervisor™, and Parallels Server™. Other examples are possible and contemplated.

In the illustrated embodiment, virtualization module 160 is configured to implement a number of virtual machines 180a-n, as well as a virtual network 175, virtual storage 165, and a web services interface 190. Examples of each of these elements will be discussed in turn, it being noted that numerous variations and alternative configurations are possible. In various embodiments, various elements may be referred to using alternative terminology. For example, individual virtual machines 180 are referred to herein as "instances," such as "distinct computing instances" and the state of various virtual machines 180 (e.g., their applications, data, and configuration) may correspond to "Machine Images" or MIs. These distinct computing instances can support distinct users.

It is noted that processes that implement various virtualized elements such as virtual machines 180, virtual network 175, and virtual storage 165 may be configured to execute on different physical hardware than virtualization module 160 itself. For example, virtualization module 160 may be configured to employ remote procedure calls or other techniques to cause a process or thread corresponding to a particular virtual machine 180, or any other virtualized element, to be executed on a different physical system that possibly may have a different configuration than physical system 100.

Any number of virtual machines 180 may be deployed, depending on the resource capabilities of the underlying physical system 100 as well as virtualization module 160. Generally speaking, each of virtual machines 180 may be configured to host its own copy of an operating system and applications, which may execute independently of the other virtual machines 180. For example, FIG. 1 illustrates virtual machine 180n as including a virtual operating system 185 as well as one or more applications 195. Virtual operating system 185 may correspond to any suitable operating system, which may include any of the types of operating systems mentioned above with respect to operating system 150. Virtual operating system 185 may also be distinct from the underlying operating system 150 that executes on physical computer system 100. For example, virtual operating system 185 and operating system 150 may be completely different operating systems. Alternatively, they may correspond to the same type of operating system, but may each have distinct copies of data structures and/or executable code, and may be configured to execute separately from one another. Virtualized operating system 185 may contain a monitoring module 130 for tracking operations virtualized operating system 185, such as through remote metadata monitoring using injectable code.

Each virtual machine 180 may be configured to operate as though it were an independent physical machine possessing those resources of physical system 100 that have been allocated to the virtual machine 180. For example, virtual machine 180*a* may be configured to execute a version of Microsoft Windows™ and one or more Windows applications, while virtual machine 180*n* may be configured to execute a version of Linux and one or more Linux applications. In some embodiments, the operating systems and applications executing on a given virtual machine 180 may be incapable of discerning that they are running in a virtual rather than a physical system. Thus, virtualization may be performed transparently with respect to each virtual machine 180.

In various embodiments, virtualization module 160 may be configured to cause virtual machines 180*a*-*n* to be instantiated, modified and destroyed in response to configuration requests received by virtualization module 160, e.g., from clients that may be external to physical system 100. The client may correspond to a process executing on behalf of a user, either on physical system 100 or on a different system configured to communicate with physical system 100, e.g., via a network.

In various embodiments, the client's configuration request may include configuration parameters for the requested given virtual machine 180. For example, the client may specify particular resources for the given virtual machine 180, such as an amount of memory, a particular level of processor performance, or the like. Alternatively, the client may specify a particular type or class of virtual machine 180 from among a set of available configurations. For example, virtualization module 160 may present generic "small," "medium," "large," and/or other types of virtual machine configurations for selection by the client, each having defined memory, performance, and/or other characteristics. In some embodiments, these characteristics included in the configuration request may include storage parameters such as a volume format and destination location or destination locations for storing portions of virtual storage 165 or other data structures associated with a virtual machine 180. In some embodiments, these characteristics may include a source location retrieving portions of virtual storage 165 or other data structures associated with a virtual machine 180. Such source and destination locations can be locally hosted within physical system 100 or accessed remotely, e.g., via a network. Such source and destination locations can include a block-storage service in which volumes within virtual storage 165 are stored as groups of blocks in block-level storage.

In some embodiments, the client's configuration request may also include information regarding how the state of the given virtual machine 180 should be initialized. For example, the request may specify the operating system 185 that should be booted, the application(s) 195 that should be available, and/or any data, libraries, or other inputs that may be needed to perform the client's computation. In various embodiments, the client may select an initialization state from a number of options (e.g., may select from a list of available operating systems), may provide a detailed memory image reflecting the desired initial state of the given virtual machine 180 (e.g., reflecting executable code and/or data), or a combination of these or other techniques.

In response to a configuration request to create or initialize a given virtual machine 180, virtualization module 160 may be configured to allocate resources of physical system 100 to the given virtual machine 180, such as by setting aside a certain amount of system memory 120 to be used by the given virtual machine 180 as its own virtual system memory. Virtualization module 160 may also initialize the given virtual machine 180. For example, the given virtual machine 180 may be initialized according to the client's specification, or to a default state.

Once configured and initialized (which may occur concurrently or as part of the same operation), given virtual machine 180 may then begin operating. For example, operating system 185 may boot or resume from a previously defined state. Application(s) 195 may execute, either in an interactive fashion (i.e., receiving input from the client during operation) or autonomously. In various embodiments, as described below, virtualization module 160 may provide a given virtual machine 180 with access to storage as well as a virtual network that may allow given virtual machine 180 to communicate with other virtual machines 180.

At some point, a request to modify or terminate given virtual machine 180 may occur. For example, a client may initiate such a request when the task for which given virtual machine 180 was configured has completed, or for some other reason. Alternatively, virtualization module 160 may initiate such a request, for example in the event that the machine becomes unstable or violates some aspect of the client's terms of use. In response, a given virtual machine 180 may be modified or terminated and its resources freed for use by other virtual machines. For example, virtualization module 160 may attempt to perform an orderly shutdown of given virtual machine 180 if possible. Virtualization module 160 may archive or otherwise preserve the state of given virtual machine 180, information about its configuration within the virtual computing environment, and/or any other salient information. Once these or any other housekeeping tasks have completed, given virtual machine 180 may cease to exist as an entity.

In addition to providing for the configuration and operation of virtual machines 180, virtualization module 160 may be configured to provide for virtualized network connectivity among virtual machines 180 via virtual network 175. For example, virtual network 175 may be configured to emulate a local area network (LAN) or any other suitable type or topology of network. Through virtual network 175, virtual machines 180 may be configured to communicate with one another as though they were physical machines connected to a physical network.

In some embodiments, virtualization module 160 may be configured to bridge virtual networks implemented on different physical systems in order to implement virtual networks of large scale. For example, virtual machines 180 implemented on distinct physical systems 100 may nonetheless be able to communicate with one another as part of the same general virtual network 175. In such embodiments, different instances of virtualization module 160 may be configured to communicate information with one another via a physical network connecting their respective physical systems 100 in order to implement virtual network communication among their virtual machines 180.

Virtualization module 160 may also be configured to provide virtual machines 180 with access to mass storage, shown as virtual storage 165. For example, virtual storage 165 may be configured as a block storage device (e.g., a logical storage volume composed of blocks stored on a block storage service), a file system, a database, or any other suitable type of mass storage that may be presented to a computer system. Embodiments of virtual storage 165 may also be referred to generically as mass storage resources. In some embodiments, virtual storage 165 may be implemented as a virtual network-connected device accessible to virtual machines 180 via virtual network 175. For example, virtual storage 165 may be configured as a virtualized network attached storage (NAS) device, as a virtualized storage area network (SAN), as a storage service accessible through Internet protocols (e.g., as a web-services-based storage service), or in any other suitable fashion. In some embodiments, virtual storage 165 may be implemented via a service, either locally implemented or remotely accessible across a network.

In some embodiments, management of virtual storage 165 may be handled by virtualization module 160 directly. For example, virtualization module 160 may include the functionality necessary to implement a virtualized volume server, file server, or other type of mass storage architecture and communicate directly with storage devices, such as by sending block data transaction instructions to a block storage service. In other embodiments, virtualization module 160 may instead provide interfaces through which virtual machines 180 may access storage that exists and is managed externally to virtualization module 160. For example, some other software component executing on physical system 100 or another system may be configured to provide mass storage as well as an application programming interface (API) through which to access storage. Virtualization module 160 may then be configured to pass storage access requests, such as block data transaction instructions, from virtual machines 180 to this external API.

Virtualization module 160 may be configured to support a number of different types of interfaces through which a client may interact with a particular virtual machine 180. For example, virtualization module 160 may be configured to perform basic terminal emulation to allow a client to provide textual input to virtual machines 180 and to return textual output for display to the client. In cases where a given virtual machine 180 supports more sophisticated user interfaces, such as windowing systems or other types of graphical user interfaces (GUIs) that may be hosted by software executing within given virtual machine 180, virtualization module 160 may be configured to pass input from the client's input devices (e.g., keyboard, pointing device, etc.) to given virtual machine 180 and to pass graphical output to the client.

In some embodiments, virtualized computing may be offered as an on-demand, paid service to clients. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources. Generally speaking, to provide virtualized computing services to clients, virtualization module 160 may be configured to present a virtualized computing service API to clients, through which the clients may submit various types of requests for virtualized computing services. For example, as described in greater detail below, clients may submit requests via the virtualized computing service API for virtualized computing resources to be instantiated, initialized, and/or deleted. Clients may also submit requests for various computations to be performed by virtualized computing resources.

In the embodiment illustrated in FIG. 1, virtualization module 160 may be configured to present virtualized computing resources such as virtual machines 180 to clients as part of a web service via web services interface 190. Generally speaking, a web service may refer to computing functionality that is made available to clients through calls made by clients to one or more web services endpoints, where the web services endpoints are addressable by the clients according to an application-level, Internet-based transport protocol, such as the Hypertext Transfer Protocol (HTTP). For example, a web services endpoint may implement a particular API that defines the web services operations that clients may request. In some embodiments, web services interface 190 may be configured to implement the addressable web services endpoint(s), and may include functionality configured to receive and send web services request and response information with respect to clients.

To request that the web service perform a particular operation, clients may format the request in the manner specified by the API and convey the request to the addressable endpoint. For example, the endpoint may be addressable according to a Uniform Resource Indicator (URI) of the form "endpoint.domainname.toplevel" such as, e.g., virtualcomputing.company.com. Alternatively, the endpoint may be addressable according to a numeric-form address such as, e.g., an IP address.

In various embodiments, web services interface 190 may be configured to be invoked by clients in any of a number of suitable ways. For example, web services interface 190 may be configured to implement a Representational State Transfer (REST)-style web services architecture. Generally speaking, in a REST architecture, the requested web services operation and its various parameters may be appended to the web services call that is made to the web services endpoint according to the transport protocol. For example, the details of the requested operation, such as a configuration request, may be included as parameters of an HTTP request method such as GET, PUT, or POST. Alternatively, web services interface 190 may be configured to implement a document- or message-oriented architecture. For example, the details of the requested operation may be formatted by the client as an eXtensible Markup Language (XML) document and encapsulated using a version of the Simple Object Access Protocol (SOAP). Upon receiving such a document, web services interface 190 may be configured to extract the details of the requested web services operation and attempt to perform the operation.

In the context of virtualized computing as a web service, it is contemplated that the API implemented by web services interface 190 may support any or all of the types of operations made available to clients by virtualization module 160, including storage operations such as the execution of requests to store data on a volume in block-level storage. Such storage requests are, in one embodiment, block data transaction instructions. For example, an API may support the transmission, receipt and execution of block data transaction instructions. The API may further support the configuration, initialization, modification, and termination of storage arrangements through configuration requests as discussed above. Additionally, in some embodiments, the API may support the exchange of input and output (textual, graphical, audio, or otherwise) between the client and virtual machines 180 or other virtualized resources.

Data Centers and Block Storage Services

Figure 2A:
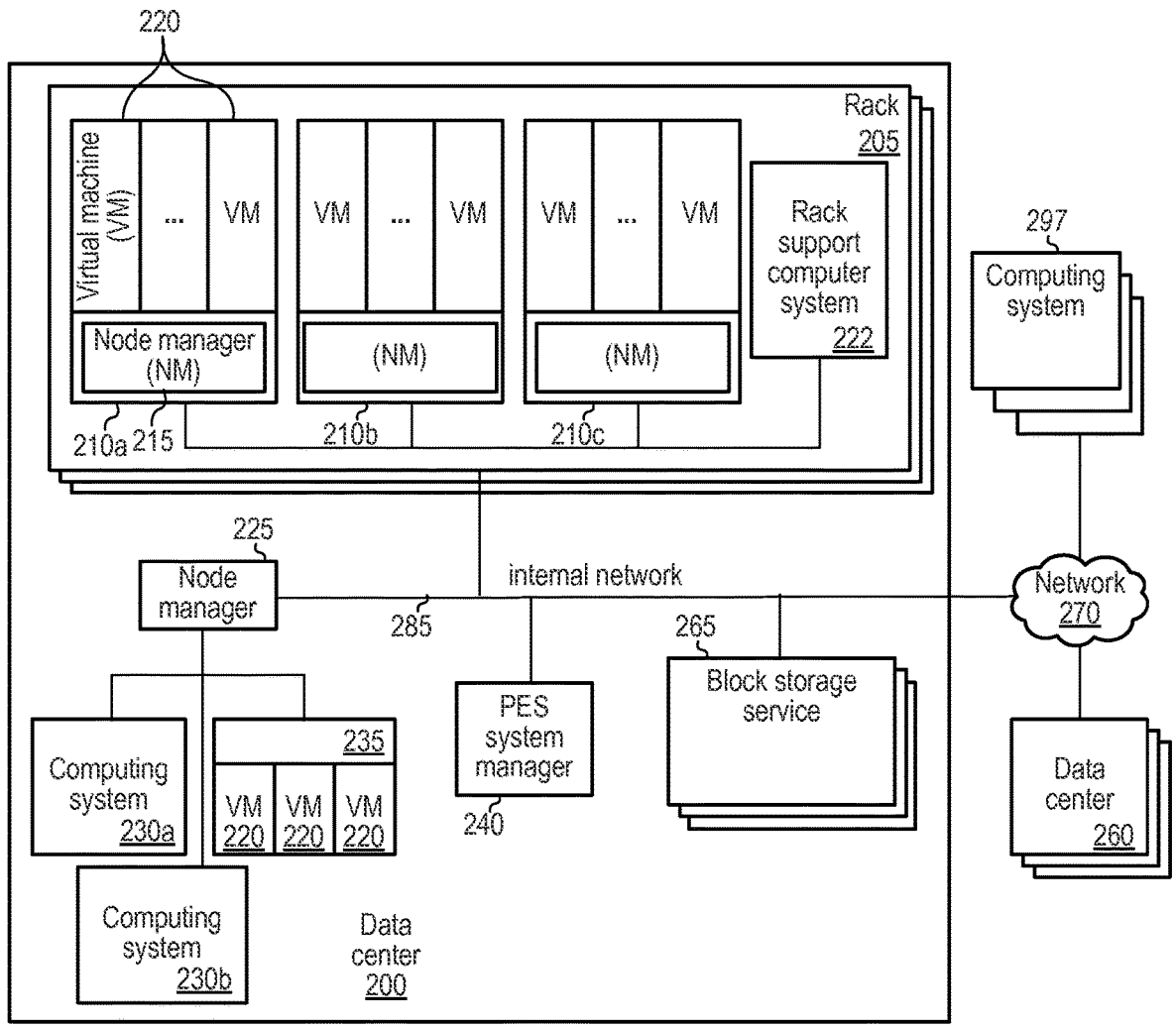
FIG. 2A illustrates a network diagram for an example embodiment in which multiple computing systems execute programs and access storage.

Referring now to FIG. 2A, a network diagram for an example embodiment in which multiple computing systems execute programs and access storage is depicted. A program execution service manages the execution of programs on various host computing systems located within a data center 200, and a block storage service works in conjunction with multiple other storage systems at the data center to provide block-level storage to those executing programs. Enhancements to the block-level storage, as described below, are executed.

In this example embodiment, data center 200 includes a number of racks 205, and each rack includes a number of host computing systems, as well as an optional rack support computer system 222. Host computing systems 210*a-c* on the illustrated rack 205 each host one or more virtual machines 220, as well as a distinct node manager 215 associated with the virtual machines on that host computing system. Node manager 215 manages the virtual machines associated with the host computing system on which node manager 215 resides. One or more other host computing systems 235 also each host one or more virtual machines 220 in this example. Each virtual machine 220 may act as an independent computing instance for executing one or more program copies (not shown) for a user (not shown), such as a customer of a program execution service accessed through a web services interface, such as the web services interface 190 discussed with respect to FIG. 1.

In addition, the example data center 200 of FIG. 2 includes host computing systems 230*a-b* that do not include distinct virtual machines, but may nonetheless each act as a computing node for one or more programs (not shown) being executed for a user. A node manager module 225 executing on a computing system (not shown) distinct from host computing systems 230*a-b* and 235 is associated with host computing systems 230*a-b* and 235 to manage computing nodes provided by those host computing systems, in a manner similar to the node manager modules 215 for host computing systems 210. Rack support computer system 222 may provide various utility services for other computing systems local to its rack 205 (e.g., long-term storage, metering and other monitoring of program execution and/or non-local block data storage access performed by other computing systems to the local rack, etc.), as well as possibly to other computer systems located in the data center. Each of computing systems 210, 230, and 235 may also have one or more local attached storage devices (not shown), such as to store local copies of programs and/or data created by or otherwise used by the executing programs, a well as various other components.

An optional program execution service (PES) system manager 240 is also illustrated. PES system manager 240 is a computing system executing a PES system manager module to provide assistance in managing the execution of programs on the computing nodes provided by host computing systems 210, 230, and 235 (or, optionally, on computing systems (not shown) located within one or more other data centers 260, or other remote computing systems 297 available over a network 270. PES system manager 240 may provide a variety of services in addition to managing execution of programs, including the management of user accounts (e.g., creation, deletion, billing, collection of payment, etc.). PES system manager 240 may further provide the registration, storage and distribution of programs to be executed, as well as the collection and processing of performance and auditing data related to the execution of programs. In some embodiments, PES system manager 240 may coordinate with node manager modules 215 and 225 to manage program execution on computing nodes associated with node manager modules 215 and 225. Data center 200 also includes a block storage service 265, which is discussed in greater detail below with respect to FIG. 2B, for providing block-level data storage to programs executing on computing nodes provided by host computing systems 210, 230, and 235 located within data center 200 or optionally computing systems (not shown) located within one or more other data centers 260, or other remote computing systems 297 available over a network 270.

Figure 2B:
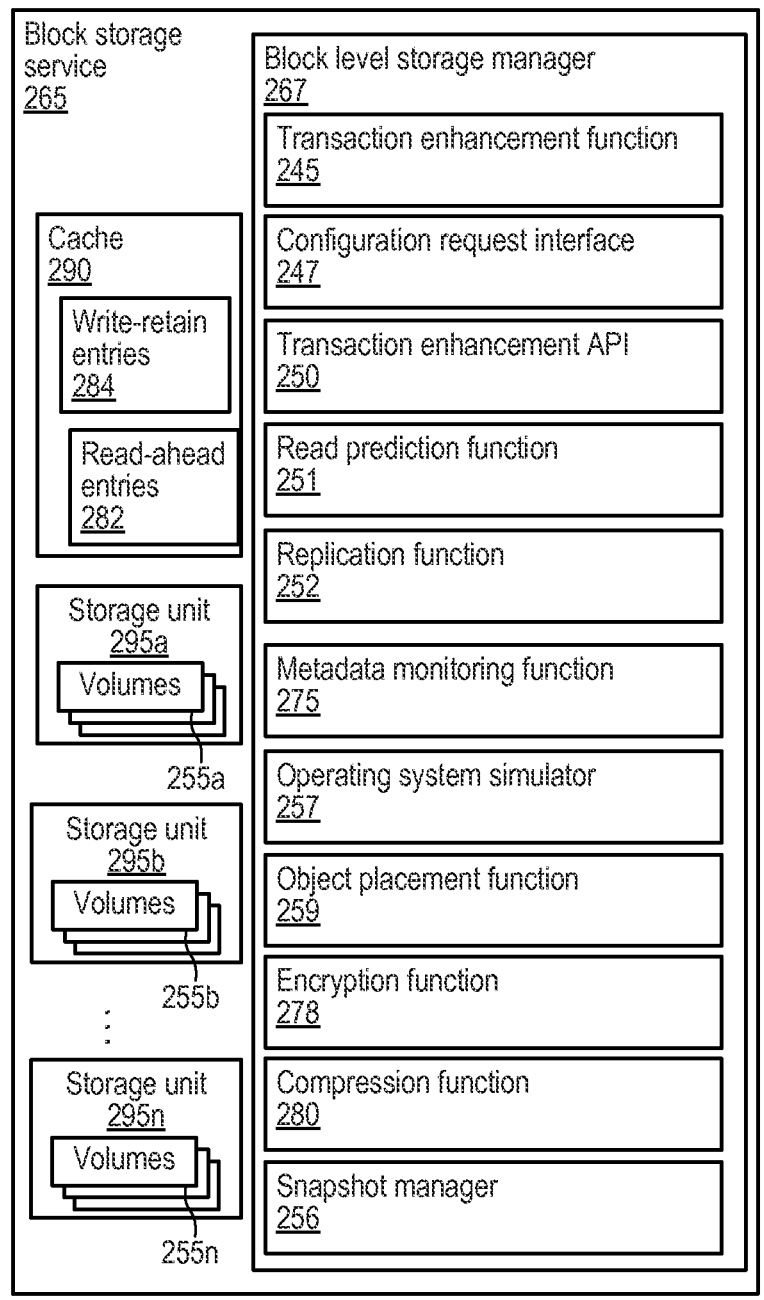
FIG. 2B illustrates a block storage service for performing storage operations according to one embodiment.

FIG. 2B illustrates a block storage service for performing storage operations according to one embodiment. Block storage service 265 is a storage system, composed of a pool of multiple independent server block data storage systems (labeled as storage units 295*a*-295*n*), which provides block level storage for storing one or more sets of volumes 255*a*-255*n* in groups of allocated blocks of storage space. In some embodiments, volumes 255*a*-255*n* will span multiple storage units 295*a*-295*n* to provide flexible capacity allocation that is responsive to changes in the demand for both storage space and operational bandwidth. While block storage service 265 is shown in FIG. 2B as containing all of storage units 295*a*-295*n*, one skilled in the art will, in light of having read the present disclosure, understand that some of storage units 295*a*-295*n* may be located in a single system and that others of storage units 295*a*-295*n* may associated with block storage service 265 across an internal or external network. Thus, block storage service 265 may be embodied as a functional arrangement of hardware and processes associated for performing relevant operations rather than as a strictly physical embodiment of collocated hardware.

Block storage service 265 executes a block-level storage manager 267 to assist in the operation of block storage service 265. Specifically, and with reference again to FIG. 2A, block level storage manager 267 assists in managing the availability of block data storage to programs executing on computing nodes provided by host computing systems 210, 230, and 235 located within data center 200 or optionally computing systems (not shown) located within one or more other data centers 260, or other remote computing systems 297 available over a network 270.

In the embodiment portrayed in FIG. 2A and FIG. 2B, access to volumes 255*a*-255*n* is provided over an internal network 285 to programs executing on nodes 210 and 235 in response to block data transaction instructions. Block level storage manager 267 may provide a variety of services related to providing block level storage functionality, including the management of user accounts (e.g., creation, deletion, billing, collection of payment, etc.). Block level storage manager 267 may further provide services related to the creation, usage and deletion of volumes 255*a*-255*n* in response to configuration requests. Block level storage manager 267 may also provide services related to the collection and processing of performance and auditing data related to the use of volumes 255*a*-255*n*. Such performance and auditing data may include measurements of the effectiveness of storage enhancements executed with respect to data stored in storage units 295*a*-295*n*.

Block level storage manager 267 may also provide services related to the creation, usage and deletion of snapshots of data on block storage service 265 through a snapshot manager 256. Such snapshots are fixed point-in-time representation of the state of corresponding portions or ones of volumes 255a-255n. In some embodiments, snapshots are used for the purpose of executing certain block storage transaction enhancements, such as defragmentation and object placement, while expediting the release of system resources for the performance of concurrent operations. In some embodiments, snapshots may be stored locally. Alternatively, snapshots may be stored at a location remote from block storage service 265.

Returning to FIG. 2B, block level storage manager 267 includes a transaction enhancement function 245. In one embodiment, working in conjunction with other components of block level storage manager 267, transaction enhancement function 245 determines block storage transaction enhancements applicable by block storage service 265 to data, such as data in volumes 255a-225n or in other data structures (not shown), based on information about the data stored by block storage service 265. Working in conjunction with other components of block level storage manager 267, transaction enhancement function 245 also performs the block storage transaction enhancements with respect to the data.

Block level storage manager 267 additionally includes a configuration request interface 247 for receiving information from users about the configuration and characteristics of data structures, indicating, among other parameters, volume formats of volumes 255a-255n or other data structures stored in storage units 295a-295n. Such configuration requests can be received at the time of volume creation or after a volume is created. Similarly, such configuration requests may be applicable to other data groupings, such as database tables. Such configuration requests can also be modified after creation of a data grouping to change the information about the data that is provided to block storage service 265. In one embodiment, block level storage manager 267 further includes a transaction enhancement API 250 for extracting, from block data transaction instructions, information about the data being stored by the block storage service. The information is useful in determining block storage enhancements and, in some embodiments, includes characterizations of instruction content embedded in block data transaction instructions by applications or operating systems of the distinct computing instances sending the block data transaction instructions.

Block level storage manager 267 further includes a read prediction function 251 for determining which blocks within storage units 295a-295n are likely to be read from storage units 295a-295n within a given interval. Listings of blocks within storage units 295a-295n that are likely to be read from storage units 295a-295n in such an interval may be recorded as read prediction patterns (not shown). Read-prediction patterns are discussed below with respect to FIG. 5. In one embodiment, when blocks already stored within storage units 295a-295n are predicted to have a suitably high likelihood of being read from storage units 295a-295n, those blocks can be read from storage units 295a-295n to read-ahead entries 282 in cache 290. Similarly, when content of one or more block data transaction instructions received by block storage service 265 for storage units 295a-295n includes blocks predicted to have a relatively high likelihood of being read in a suitably short period of time, such blocks can be written to the appropriate one of storage units 295a-295n and also stored as write-retain entries 284 in cache 290. Examples of an embodiment of use of are cache is discussed below with respect to FIG. 5.

In one embodiment, cache 290 will be implemented using storage structures (e.g., memory) that have a faster response time than that of storage units 295a-295n, which may be embodied as magnetic disks. Retention of a block in one of write-retain entries 284 in cache 290 and read-ahead entries 282 in cache 290 results in the ability to respond to a request for the cached block from the relatively-faster memory of cache 290 rather than incurring the delay required to fetch the block from one of storage units 295a-295n. In one embodiment, the storage enhancement achieved through retention of a block cache 290 thereby results in faster performance of read requests routed to block storage service 265.

Block level storage manager 267 also includes an encryption function 278 for encrypting data contained in one or more block data transaction instructions received by block storage service 265 prior to storage of the content as encrypted blocks within storage units 295a-295n. One example of an embodiment of use of an encryption function is discussed below with respect to FIG. 6. In one embodiment, the storage enhancement achieved through storage of encrypted blocks on storage units 295a-295n results in enhanced security of sensitive data within volumes 255a-255n on storage units 295a-295n.

Further, block level storage manager 267 also includes a compression function 278 for compressing data contained in one or more block data transaction instructions received by block storage service 265 prior to storage on storage units 295a-295n as compressed blocks within storage units 295a-295n. One example of an embodiment of use of a compression function is discussed below with respect to FIG. 6. In one embodiment, the storage enhancement achieved through storage of compressed blocks within storage units 295a-295n results in enhanced efficiency with respect to the use of storage capacity on storage units 295a-295n.

Additionally, block level storage manager 267 includes a replication function 252 for replicating blocks within storage units 295a-295n that are predicted to be read repeatedly or frequently from storage units 295a-295n. One example of an embodiment of use of a replication function is discussed below with respect to FIG. 6. In one embodiment, replication to others of storage units 295a-295n of blocks within a first of storage units 295a-295n that are predicted to be read repeatedly or frequently from storage units 295a-295n enables routing of frequent or repeated requests for a particular set of blocks to multiple ones of storage units 295a-295n. Routing of frequent or repeated requests for a particular set of blocks to multiple ones of storage units 295a-295n, rather than concentration of those same requests on a single one of storage units 295a-295n, allows for parallel execution of the requests, rather than queuing and serial execution of the requests. As a result of the parallel execution, the storage enhancement achieved through replication of blocks on storage units 295a-295n results in faster response times and more even loading of storage units 295a-295n with respect to requests for blocks within storage units 295a-295n. Such an enhancement may be particularly useful for blocks containing items with a tendency to be read frequently, and on which other results depend, such as the index of a database.

Block level storage manager 267 further includes a metadata monitoring function 275 for extracting metadata from content of one or more block data transaction instructions received by block storage service 265. In one embodiment, block data transaction instructions are composed of commands and arguments on which the commands operate. For example, one embodiment of a block data transaction instruction to store a block of data includes a "store" command and as arguments includes one or more blocks of data for storage, metadata associated with the blocks, and one or more block identifiers associated with a location on which the blocks of data for storage are intended to be stored.

Metadata monitoring function 275 monitors and extracts the metadata for subsequent use in determining information used for selecting enhancements to be performed by block storage service 265. In some embodiments, metadata monitoring function 275 may pass extracted metadata to an operating system simulator 257 or to other functions within block level storage manager 267, such as transaction enhancement function 245. In one embodiment, metadata monitoring function 275 provides information that enhances the degree to which block storage service 265 is able to accurately determine the type of storage enhancements appropriate for data stored in storage units 295a-295n and is able to measure the effectiveness of enhancements executed with respect to data stored in storage units 295a-295n. In one embodiment, metadata monitoring function interprets the metadata to determine the information about the data being stored in the block storage service. The information about the data being stored in the block storage service can include characteristics of a block transaction instructions, of the volumes or other data structures in which the data is being stored, or of the data being stored by the block storage service.

Block level storage manager 267 includes an operating system simulator 257 to simulate the functions of an operating system (or portions of an operating system, such as a file system or other components) sending a block data transaction instruction for the purpose of discerning the content and structure of data stored on storage units 295a-295n by monitoring and interpreting metadata from content of block data transaction instructions received by block storage service 265 for storage units 295a-295n. In one embodiment, operating system simulator 257 uses metadata from content of block data transaction instructions received by block storage service 265 for volumes 255a-255n to identify the structure, content and organization of logical data structures, such as files and directories within volumes 255a-255n. Using this information regarding the structure, content and organization of logical data structures, operating system simulator 257 can, in some embodiments, determine enhancements, measure the effectiveness of enhancements executed with respect to storage units 295a-295n, and generate intermediate products such as expected read patterns and data structure maps for use in enhancements executed with respect to storage units 295a-295n.

Additionally, block level storage manager 267 includes an object placement function 259 for arranging content of block data transaction instructions received by block storage service 265 in a manner calculated to increase the likelihood of consecutive reads (for example, as anticipated in a predicted read pattern) or for arranging content of one or more block data transaction instructions received by block storage service 265 in contiguous block arrangements representing data structures within volumes 255a-255n. In one embodiment, object placement function 259 performs defragmentation on the basis of data structure maps. In an alternative embodiment, object placement function 257 places blocks on one of storage units 295a-295n in an order reflecting an expected read pattern. By arranging content of block data transaction instructions received by block storage service 265 for consecutive reads as anticipated in a predicted read pattern or arranging content of block data transaction instructions received by block storage service 265 in contiguous block arrangements representing data structures within volumes 255a-255n, embodiments provide storage transaction enhancements that reduce delays in fulfilling read requests by storing blocks in spatial patterns reflecting the order in which the blocks are expected to be read.

As discussed above and further discussed below, the functions and components of block storage service 265 support selecting block storage transaction enhancements applicable by block storage service 265 to data stored in storage units 295a-295n of the block storage service 265 based on information about the data, and performing the block storage transaction enhancements with respect to the data in the block storage service.

Process Steps for Storage Enhancement Determination and Execution

Figure 3A:
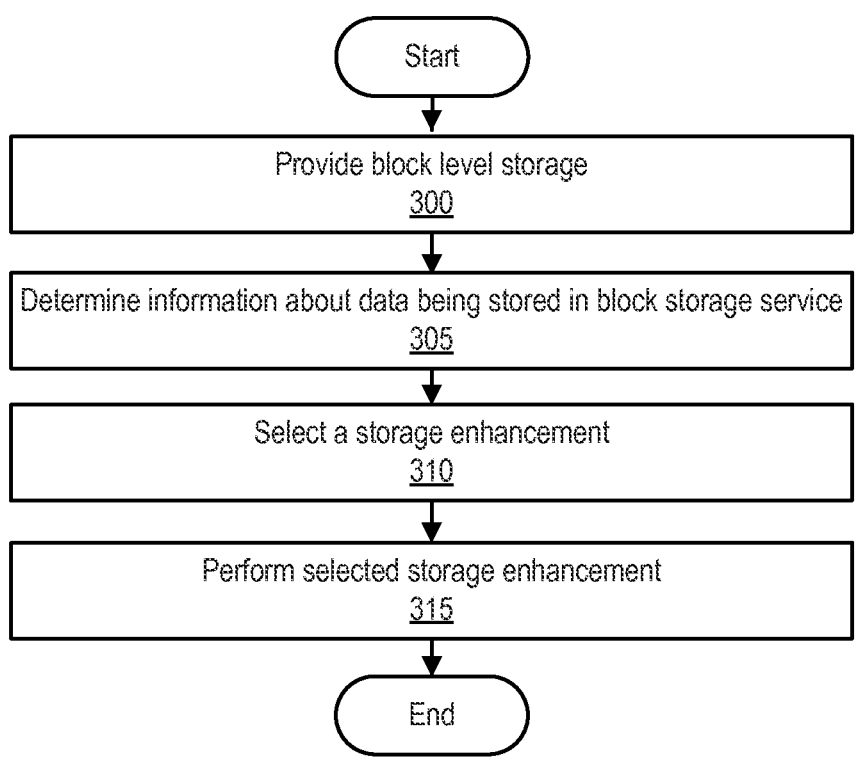
FIG. 3A is a high-level flowchart of process steps for determining and performing a block-level storage enhancement according to one embodiment.
Figure 3B:
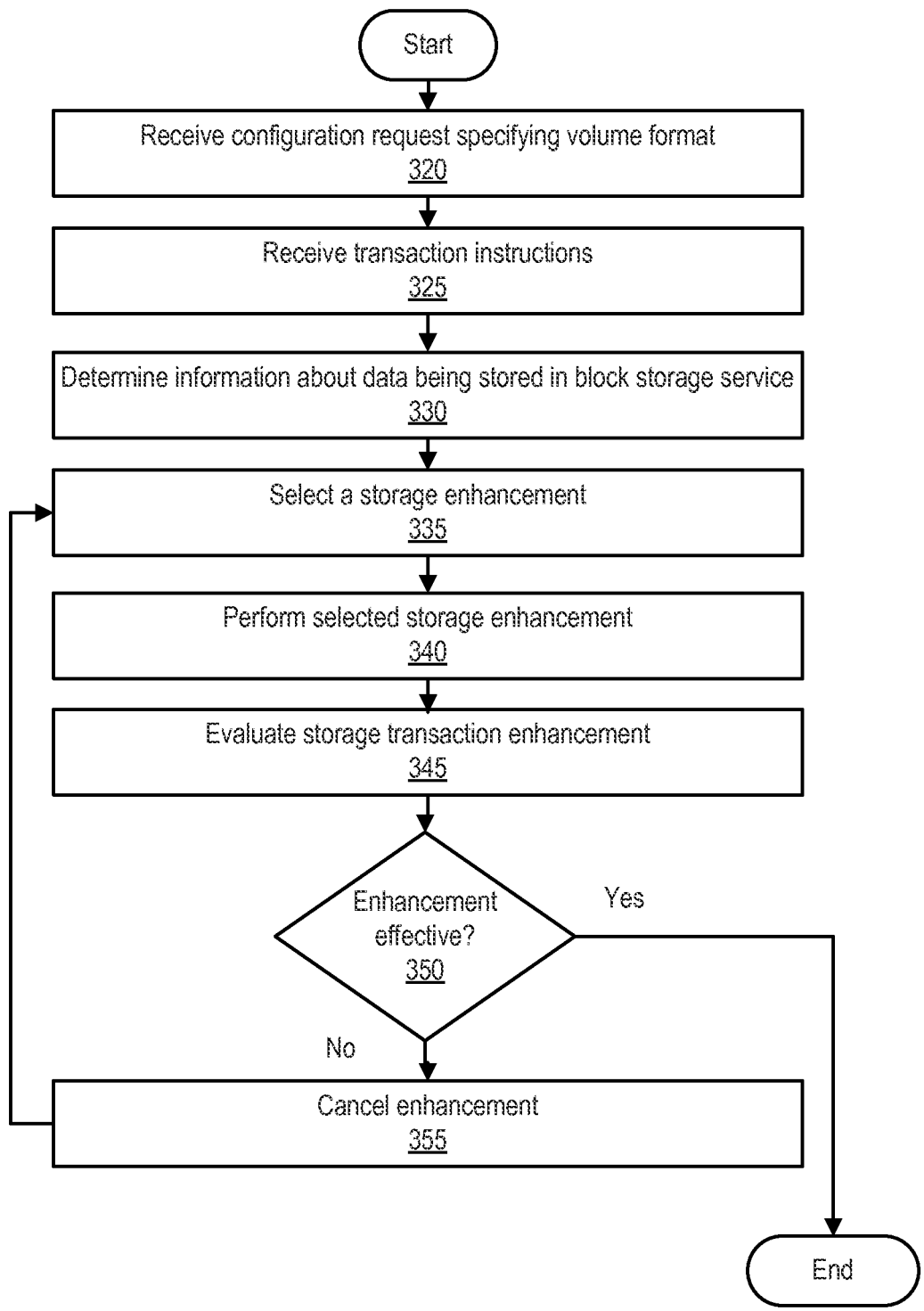
FIG. 3B is a high-level flowchart of process steps for determining, performing and evaluating a block-level storage enhancement according to one embodiment.
Figure 4:
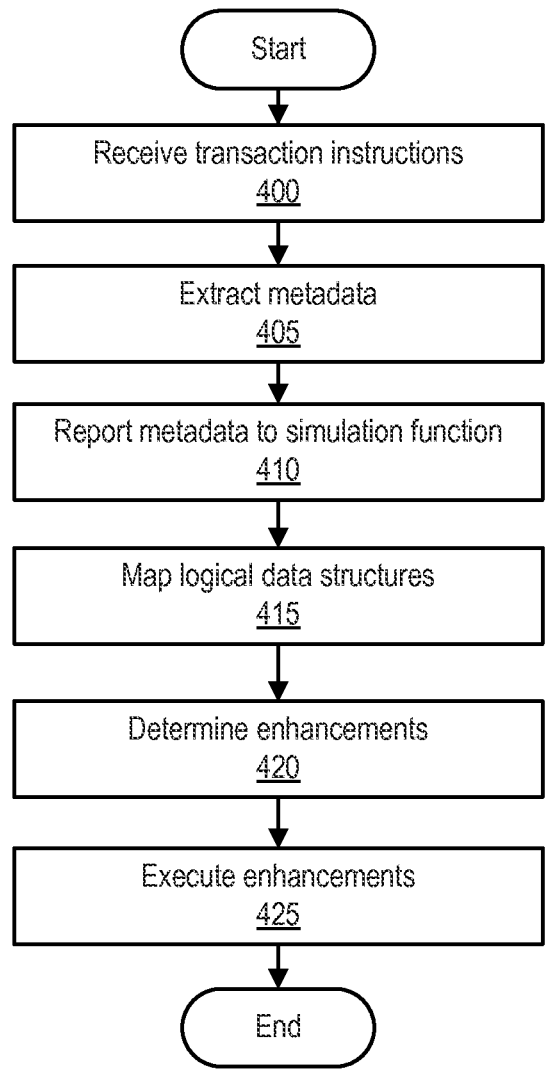
FIG. 4 is a high-level flowchart of process steps involving the use of metadata in determining and performing a block-level storage enhancement according to one embodiment.

The processes described below with respect to FIGS. 3A-4 illustrate various actions performed by an embodiment of a system for providing block storage enhancement functions within a system that provides block-level storage to distinct computing instances for distinct users. An embodiment of such a system for providing block storage enhancement functions selects block storage transaction enhancements applicable to data being stored in the block storage service. The block storage transaction enhancements are selected based on information about the data being stored by the block storage service. The information includes, in some embodiments, items of information such as volume formats of volumes (or other data structures) in the block storage service and information derived from content of block data transaction instructions and metadata received by the block storage service. Embodiments then perform the block storage transaction enhancements. Some embodiments are capable of monitoring the effectiveness of enhancements, cancelling ineffective enhancements, and providing different enhancements as replacements for the cancelled enhancements.

FIG. 3A is a high-level flowchart of a particular embodiment of process steps for determining and performing a block-level storage enhancement according to one embodiment. Block level storage is provided by the block storage service (300). Information about data being stored in the block storage service is determined (305). In some embodiments, the information can be determined with respect to configurations of large groupings of data, such as volumes, or may be based on individual block data transaction instructions. As an example, in one embodiment, a configuration request specifying a volume format is received. Such a configuration request is received from a web services interface such as web services interface 190 of FIG. 1. Alternatively, the information about the data beings stored in the block storage service may be derived from block data transaction instructions.

A block storage transaction enhancement is selected (310), such as the block storage transaction enhancements discussed above with respect to FIG. 2B. The selection is based on the information about the data being stored in the block storage service. The block storage transaction enhancement is then performed (315). The process then ends.

FIG. 3B is a high-level flowchart of process steps for determining, performing and evaluating a block-level storage enhancement according to one embodiment. A configuration request specifying a volume format is received (320). A configuration request may be received in conjunction with creation and configuration of a volume for a virtual machine. Alternatively, a configuration request specifying a volume format may be received during operation of a virtual machine and storage associated with the virtual machine for the specific purpose of enabling storage transaction enhancements. Transaction instructions are received (325), such as the block data transaction instructions discussed above. Information about data being stored in the block storage service is determined (330). The information can be derived, depending on availability, from the received transaction instructions, received configuration requests, or both. Based on the determined information, a block storage transaction enhancement is selected (335), such as one of the features or optimizations discussed above. The block storage transaction enhancement is then performed (340).

The block storage transaction enhancement is evaluated (345). In one embodiment, evaluating a block storage transaction enhancement includes measuring an effectiveness of the selected block storage transaction enhancement for the data stored in the block storage service. An example of such an evaluation includes determining the number of times that an item of data stored in a read-ahead entry of a cache was actually read from the cache.

A determination is made as to whether the block storage transaction enhancement is effective (350). In one embodiment, such a determination includes comparing a measure of effectiveness to a threshold value. For example, continuing with the discussion of the example described above with respect to block 345, a number of times that an item of data stored in a read-ahead entry of a cache was actually read from the cache can be measured and compared to a threshold value expected for a successful selection of an item of data for storage in a read-ahead entry of a cache. If the number of actual reads is above the threshold value, then the block storage transaction enhancement is determined to be effective and the process ends. If the measured value falls below the threshold value, the block storage transaction enhancement is determined to be ineffective and the enhancement is cancelled (355). The process returns to step 335, which is described above.

In an alternative embodiment, determining whether a block storage transaction enhancement is effective may include comparison of results measured before and after execution of the block storage transaction enhancement. For example, a comparison can be made between read response times associated with read requests before and after the replication of a set of blocks on multiple storage units. If response times for read requests decline as a result of the replication, the block storage transaction enhancement is determined to be effective and the process ends. If response times for read requests do not decline as a result of the replication, the block storage transaction enhancement is determined to be ineffective and the enhancement is cancelled (355).

FIG. 4 is a high-level flowchart of a particular embodiment of operations involving the use of metadata in determining and performing a block-level storage enhancement according to one embodiment. Transaction instructions are received (400), such as the block data transaction instructions discussed above. Metadata is extracted from the block data transaction instructions (405). In one embodiment, metadata is extracted by a metadata monitoring function, such as metadata monitoring function 275 discussed above with respect to FIG. 2B. The metadata from the block data transaction instructions is delivered to an operating system simulation function (410), such as operating system simulator 257 discussed above with respect to FIG. 2B. Logical data structures, within the volume with which the block data transaction instructions are associated, are mapped through a process of interpretation of the metadata by the operating system simulation process (415). A block storage transaction enhancement is determined (420) on the basis of the mapping. The block storage transaction enhancement is then performed (425). The process then ends.

Storage Cases Illustrating Interactions with Backup Storage

FIGS. 5-8B portray various use cases for employment of an embodiment of a system for providing a block storage transaction enhancement function for selecting and performing block storage transaction enhancements applicable to data in a block storage service based on data being stored by the block storage service.

Figure 5:
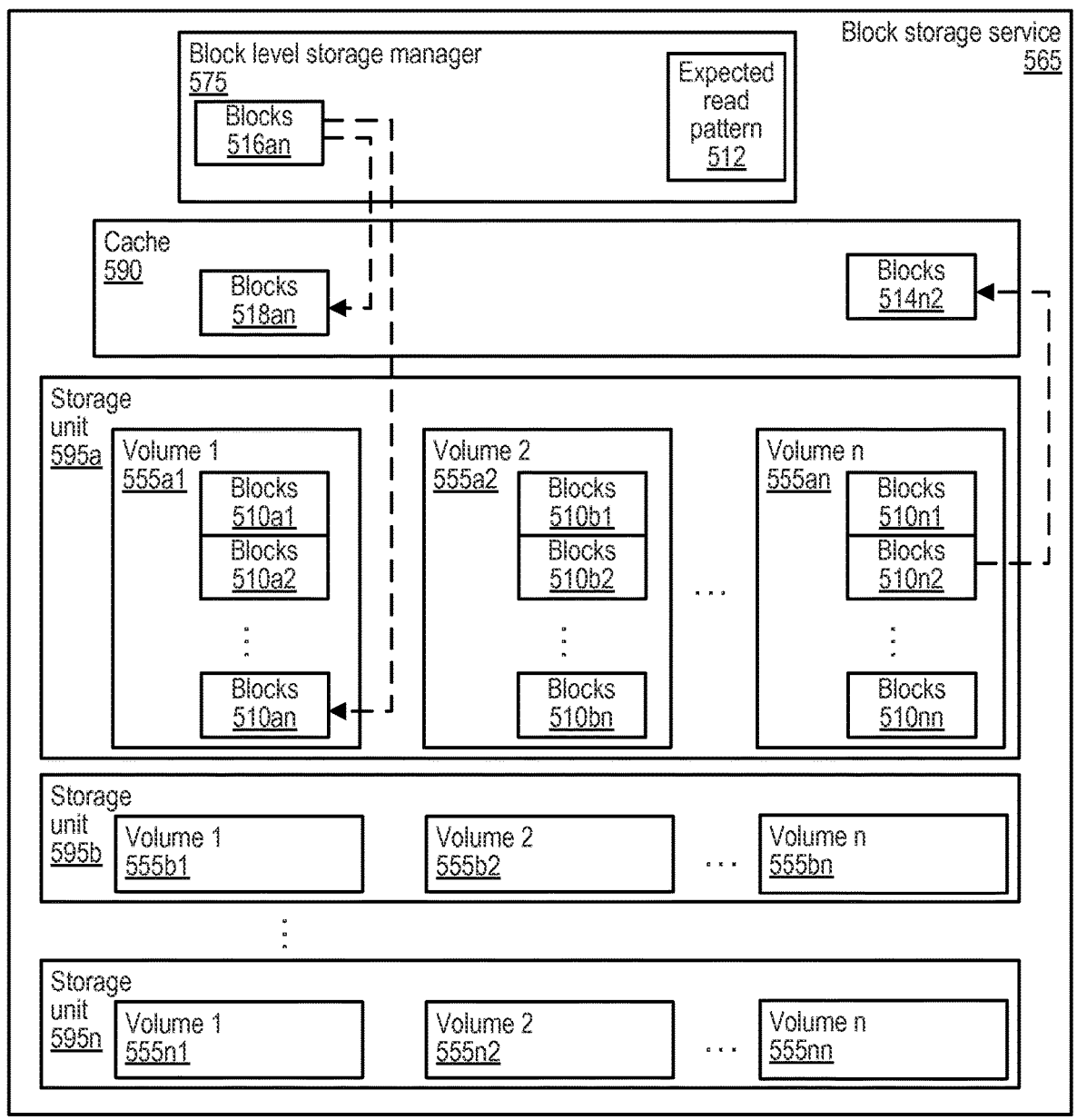
FIG. 5 is a high-level block diagram illustrating a series of storage interactions performed in executing example storage enhancements according to one embodiment.

FIG. 5 is a high-level block diagram illustrating a series of storage interactions performed in executing example storage enhancements according to one embodiment. A block storage service 565 includes a block-level storage manager 575. In one embodiment, block-level storage manager 575 is configured to provide a block storage transaction enhancement function for selecting and performing block storage transaction enhancements, such as cache operations, applicable to data being stored in a block storage service based on information about the data being stored in the block storage service. Block-level storage manager 557 generates an expected read pattern 512. Block storage system 565 further includes a cache 590, which is typically embodied as memory with fairly short response times (as compared to storage units 595*a*-595*n*) for read requests.

In one embodiment, block-level storage 565 receives blocks 516*an* (for example, as part of a set of block data transaction instructions). Blocks 516*an* arrive at block level storage manager 575 for storage on one or more of storage units 595*a*-595*n* as part of one or more of volumes 555*aa*-555*nn* (for example, as blocks 510*an* of volume 555*a*1 on storage unit 595*a*). Storage units 595*a*-595*n* are, in one embodiment, typically magnetic disks with response times that are generally longer than those of the memory embodying cache 590.

If, on the basis of expected read pattern 512, block-level storage manager 575 determines that there is a high likelihood that blocks 510*an* will be read from volume 555*a*1 on storage unit 595*a* within a sufficiently short time frame, block-level storage manager 575 may optimize the storage of blocks 516*an* by additionally storing blocks 516*an* in cache 590 as blocks 518*an*. In response to a subsequent request for access to blocks 510*an*, block level storage manager 575 responds to the request for access to blocks 510*an* by sending blocks 518*an*. As a result of the degree to which cache 590 will tend to exhibit faster response than storage unit 595*a* to a read request, responding to the request for access to blocks 510*an* by sending blocks 518*an* will result in faster execution of the request for access to blocks 510*an* than would be possible by responding to the request for access to blocks 510*an* by reading blocks 510*an* from storage unit 595*a*.

Similarly, in one embodiment, if on the basis of expected read pattern 512, block-level storage manager 575 determines that there is a high likelihood that blocks 510*n*2 will be read from volume 555*an* on storage unit 595*a* within a sufficiently short time frame, block-level storage manager 575 may optimize the storage of blocks 510*n*2 by additionally storing a copy of blocks 510*n*2 in cache 590 as blocks 514*n*2. In response to a subsequent request for access to blocks 510*n*2, block level storage manager 575 responds to the request for access to blocks 5102*n*2 by sending blocks 514*n*2. As a result of the degree to which cache 590 will tend to exhibit faster response than storage unit 595*a* to a read request, responding to the request for access to blocks 510*n*2 by sending blocks 514n2 will result in faster execution of the request for access to blocks 510n2 than would be possible by responding to the request for access to blocks 510n2 by reading blocks 510n2 from storage unit 595a.

Figure 6:
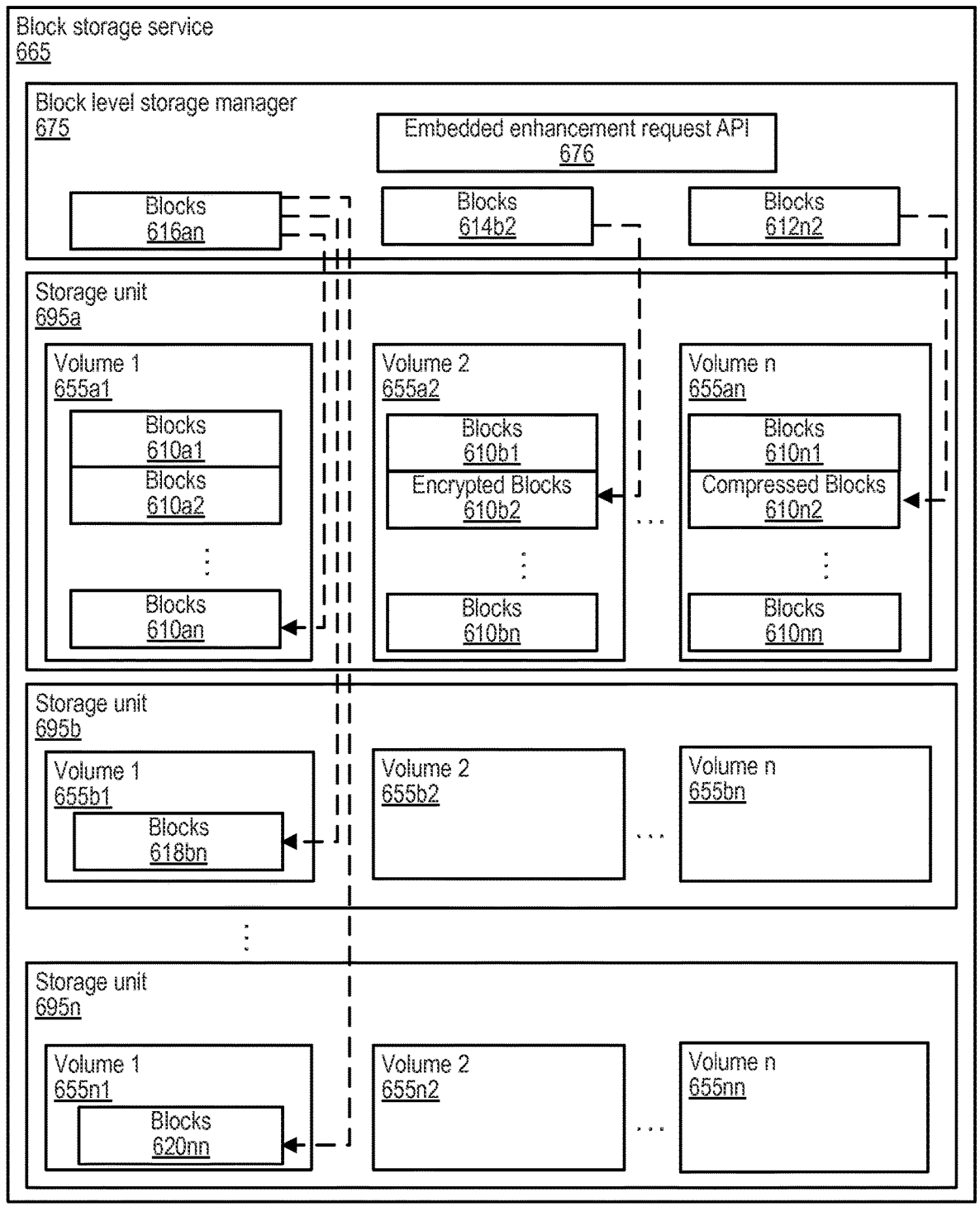
FIG. 6 is a high-level block diagram illustrating a series of storage interactions performed in executing example storage enhancements according to one embodiment.

FIG. 6 is a high-level block diagram illustrating a series of storage interactions performed in executing storage enhancements according to one embodiment. A block storage service 665 includes a block-level storage manager 675. In one embodiment, block-level storage manager 675 is configured to provide a block storage transaction enhancement function for selecting block storage transaction enhancements, such as replication, encryption and compression, applicable to data in a block storage service based on information about the data being stored in the block storage service and performing the block storage transaction enhancements with respect to the data in the block storage service. In one embodiment, block-level storage 665 receives blocks 616an (for example, as part of a set of block data transaction instructions). Blocks 616an arrive at block level storage manager 675 for storage on one or more of storage units 695a-695n as part of one or more of volumes 655aa-655nn (for example, as blocks 610an of volume 655a1 on storage unit 695a).

If block level storage manager 675 determines that the content of blocks 616an is of a nature such that blocks 616an are likely to be frequently read (e.g., with multiple simultaneous requests for some or all of the content of blocks 610an), block level storage manager 675 can cause blocks 616an to be written as blocks 610an of volume 655a1 on storage unit 695a as well as replicating blocks 610an by writing copies of blocks 616an to volume 655b1 of storage unit 695b (as blocks 618bn) and to volume 655b1 of storage unit 695b (as blocks 618bn). The advantage of such a replication optimization becomes apparent if block level storage manager 675 receives multiple simultaneous requests for some or all of the content of blocks 610an. Such multiple simultaneous requests are common with respect to some data structures, such as the index of a database and with respect to certain types of data. Rather than queuing those multiple simultaneous requests for serial fulfillment by storage unit 695a and thereby delaying the fulfillment of some of the requests, block level storage manager 675 can reroute requests for some or all of the content of blocks 610an to storage units 695b and 695n. Such rerouting allows storage units 695a-695n to fulfill the multiple simultaneous requests for some or all of the content of blocks 610an in parallel and thereby reduce the delay associated with the requests.

In one embodiment, block-level storage 665 receives blocks 614b2 (for example, as part of a set of block data transaction instructions). Blocks 614b2 arrive at block level storage manager 675 for storage on one or more of storage units 695a-695n as part of one or more of volumes 655aa-655nn (for example, as blocks 610b2 of volume 655a2 on storage unit 695a). If block level storage manager 675 determines that the content of blocks 614b2 is of a sensitive nature, such that more secure storage is desired, block level storage manager 675 may encrypt the content of blocks 614b2 and store encrypted blocks 610b2 as part of volume 655a2 on storage unit 695a. In some embodiments, block level storage manager 675 may determine in one of several ways that the content of blocks 614b2 is of a sensitive nature, such that more secure storage through an encryption feature is desired. For example, an operating system simulator within block level storage manager 675 may discern the logical structure of directories within volume 655a2 and may ascertain by interpreting metadata within the block storage transaction instructions associated with blocks 614b2 that blocks 614b2 are part of a directory typically containing sensitive information.

Alternatively, an operating system of virtual machine may communicate through an API an indication of the sensitive nature of blocks 614b2 by embedding an indication of the need for secure handling in the block storage transaction instructions associated with blocks 614b2. Such an embedded indication of the nature of data, which in some embodiments will be used to trigger application of a feature such as encryption, can be processed, in one embodiment, by an embedded enhancement request API 676. Encrypted storage of the content of blocks 614b2 provides increased security to users of block storage service 665.

In one embodiment, block-level storage 665 receives blocks 612n2 (for example, as part of a set of block data transaction instructions). Blocks 612n2 arrive at block level storage 665 for storage on one or more of storage units 695a-695n as part of one or more of volumes 655aa-655nn (for example, as blocks 610n2 of volume 655an on storage unit 695a). If block level storage manager 675 determines that the content of blocks 612n2 is of a nature such that compression is desirable (e.g., content that is unlikely to be read in the future and is highly compressible, such as text-based log files), block level storage manager 675 may compress the content of blocks 614b2 and store compressed blocks 610n2 as part of volume 655an on storage unit 695a. In some embodiments, block level storage manager 675 may determine in one of several ways that the content of blocks 612n2 is of a nature such that compression of the content of blocks 612n2 is desirable. For example, an operating system simulator within block level storage manager 675 may discern the logical structure of directories within volume 655an and may ascertain by interpreting metadata within the block storage transaction instructions associated with blocks 612n2 that blocks 612n2 are part of a directory typically containing information that is not frequently read from volume 655an (for example, a log directory). Alternatively, an operating system of virtual machine may communicate through an API an indication of the nature of blocks 612n2, such as by indicating that the data is a log file that is unlikely to be read. Compressed storage of the content of blocks 612n2 provides more space-efficient storage to users of block storage service 665.

Figure 7:
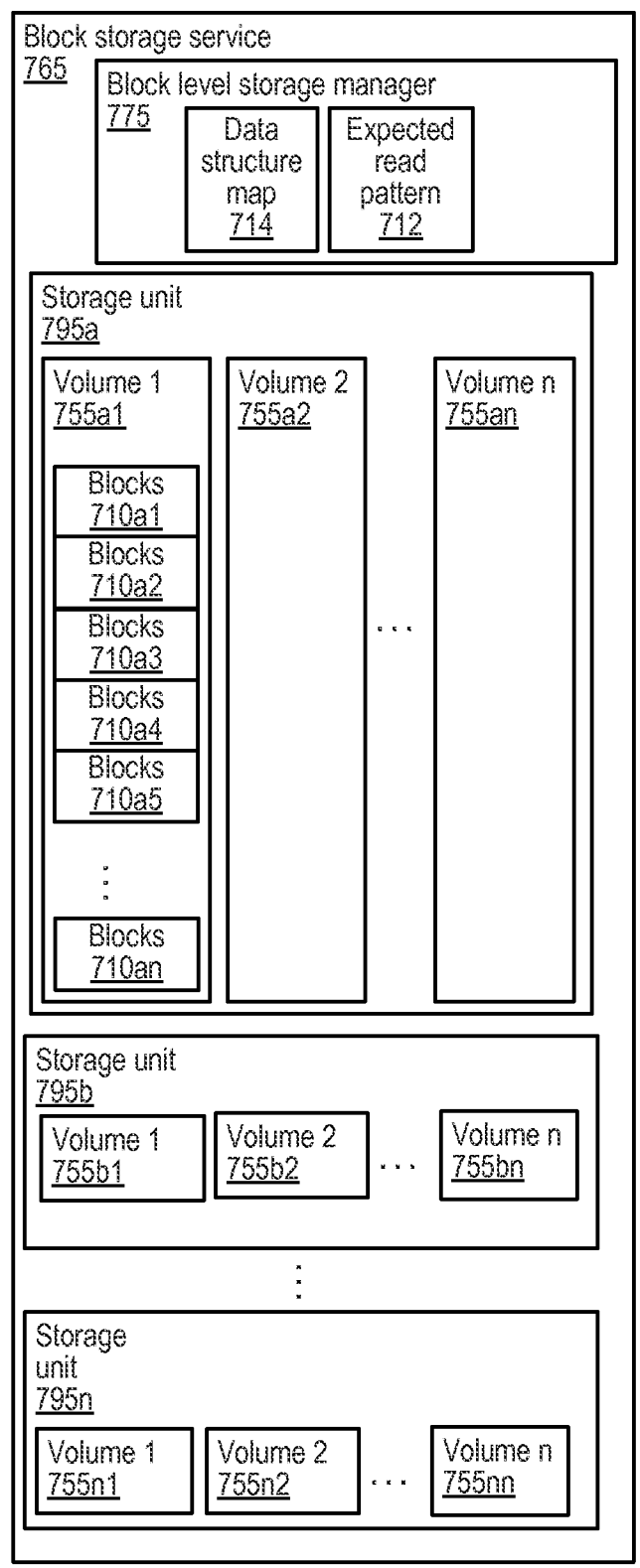
FIGS. 7-8 are high-level block diagrams illustrating results of a series of storage interactions performed in executing example storage enhancements according to one embodiment.
Figure 8:
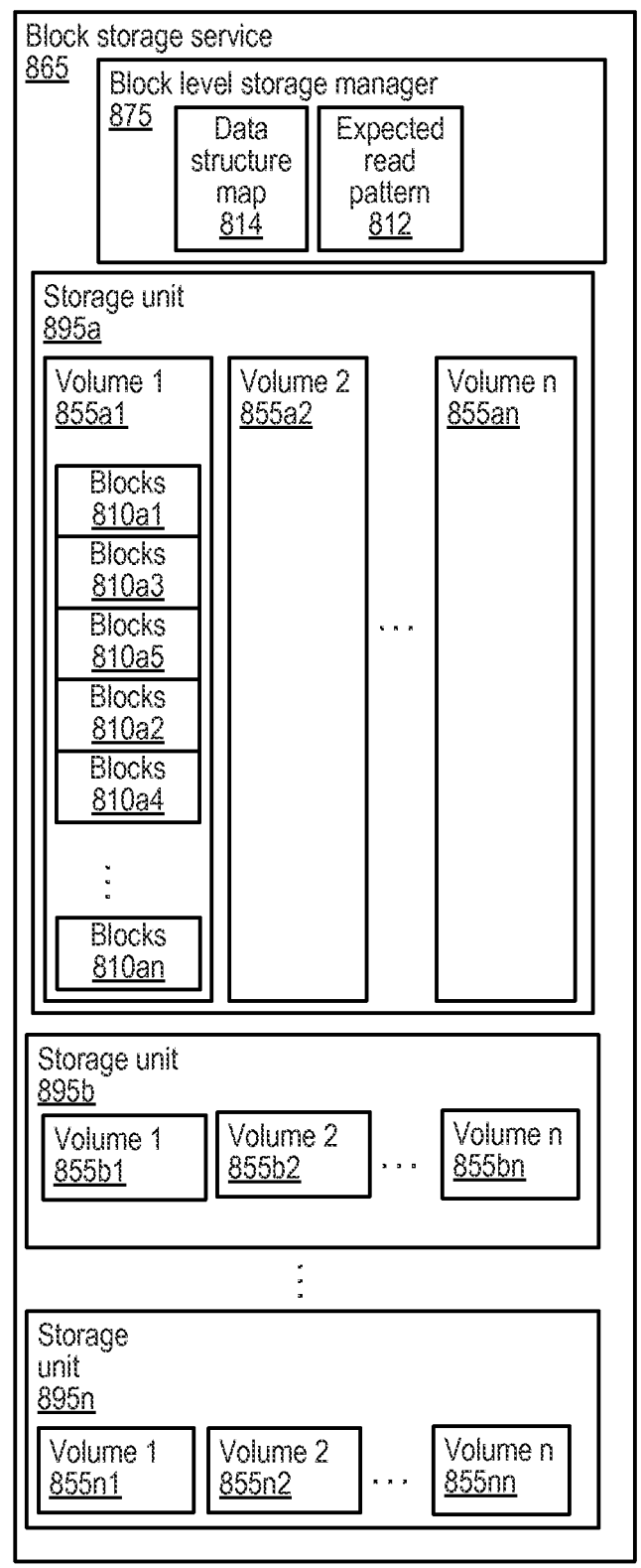

FIGS. 7-8 are high-level block diagrams illustrating results of a series of storage interactions performed in executing storage enhancements according to one embodiment. FIG. 7 illustrates a state of a block storage service 765 prior to an object placement or defragmentation enhancement. Block storage service 765 includes a block-level storage manager 775. In one embodiment, block-level storage manager 775 is configured to provide a block storage transaction enhancement function for selecting and performing block storage transaction enhancements, such as an object placement optimization for consecutive reads or defragmentation feature for logical data structures, applicable to data in a block storage service based information about the data being stored in the block storage service. Block storage service 775 includes storage units 795a-795n for storing volumes 755a1-755nn.

In volume 755a1, a series of blocks 710a1-710an has been stored contiguously in order of receipt. A data structure map 714 may indicate that the order in which blocks 710a1-710an have been stored is unrelated to the organization of logical data structures present in the content of blocks 710a1-710an. Such a data structure map may be generated by a metadata monitor such as metadata monitoring function 275 or an operating system simulator 257, both of FIG. 2B. Returning to FIG. 7, in such a situation, block-level storage manager 775 may be used to re-organize the storage of blocks 710a1-710an such that physically contiguous groups of blocks 710a1-710an contain individual data structures (e.g., files) or logically related groups of data structures (e.g., directories).

The result of such a reorganization is shown in FIG. 8. FIG. 8 illustrates a state of a block storage service 865 after an object placement or defragmentation enhancement. Block storage service 865 includes a block-level storage manager 875. Block storage service 875 includes storage units 895a-895n for storing volumes 855a1-855nn. In volume 855a1, a series of blocks 810a1-810an has been stored contiguously in an order such that contiguous groups of blocks 810a1-810an contain individual data structures (e.g., files) or logically related groups of data structures (e.g., directories or database tables). For example, blocks 810a1 and blocks 810a3 contain data of a first file. Similarly, blocks 810a5 and blocks 810a2 contain data of files of a single directory. With blocks 810a1-810an thus stored such that data from individual logical data structures is contiguously grouped, read requests associated with a particular logical data structure can be performed on contiguous data. Reads from a data structure that is stored as blocks in a contiguous arrangement typically provide a faster read time than can be provided from discontiguous reads that would be associated with blocks 710a1-710an that have been stored contiguously in order of receipt without regard to logical data structures.

Alternatively, an expected read pattern may indicate that the order in which blocks 710a1-710an have been stored is unrelated to the order in which blocks 710a1-710an are expected to be read. In such a situation, blocks 710a1-710an may be re-organized to provide object placement of blocks 710a1-710an in an order in which they are expected to be read. An arrangement similar to that shown in FIG. 8 may result, such that blocks 810a1-810an may placed in a physically contiguous arrangement allowing blocks 810a1-810an to be read consecutively in a single pass. Reads from blocks stored in expected read order and therefore consecutively read typically provide a faster read time than can be provided from discontiguous reads that would be associated with blocks 710a1-710an that have been stored contiguously in order of receipt without regard to expected read order.

Example Computer System Embodiment

It is contemplated that in some embodiments, any of the methods, techniques or components described above may be implemented as instructions and data capable of being stored or conveyed via a computer-accessible medium. Such methods or techniques may include, for example and without limitation, the various methods of a block storage service providing block-level storage to a set of distinct computing instances for a set of distinct users, in which embodiments provide a block storage transaction enhancement function for selecting and implementing block storage transaction enhancements applicable to data in a block storage service based information with respect to the data being stored in the block storage service. Examples, which are not intended to be limiting, include those performed by the elements and methods described above and shown in FIGS. 1-8, or suitable variations of such elements and methods. Such instructions may be executed to perform specific computational functions tailored to specific purposes (e.g., processing web services traffic, performing high-precision numerical arithmetic, etc.) as well as higher-order functions such as operating system functionality, virtualization functionality, network communications functionality, application functionality, and/or any other suitable functions.

Figure 9:
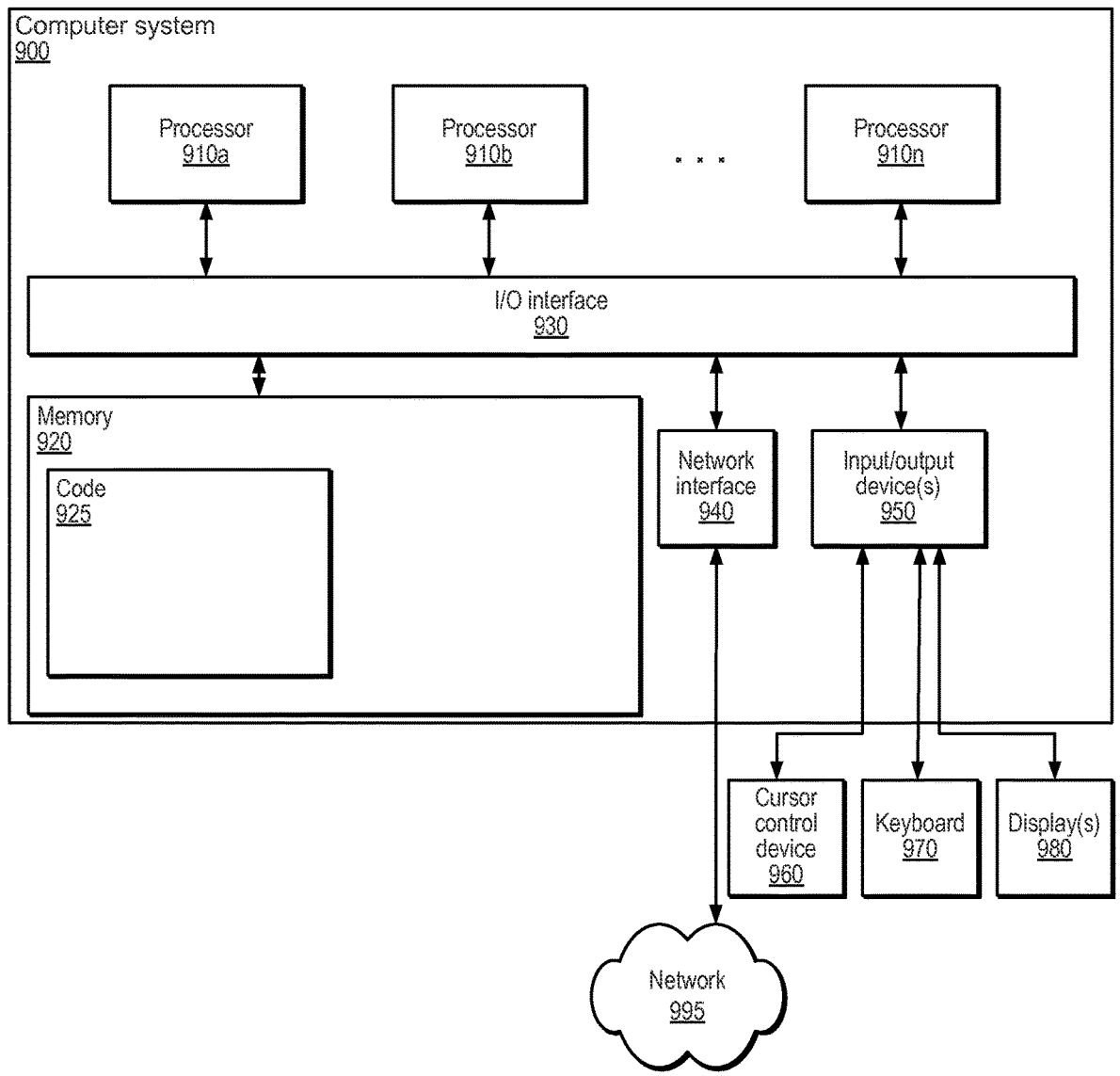
FIG. 9 is a high-level block diagram illustrating a configuration of computing system components suitable for implementing an embodiment.

One example embodiment of a computer system including computer-accessible media is illustrated in FIG. 9. Computer system 900 may correspond to an example configuration of physical computer system 100 shown in FIG. 1. Correspondingly, in various embodiments, the functionality of any of the various modules or methods described above (e.g., as provided by operating system 150, virtualization module 160, virtual machines 180, and/or other elements described above) may be implemented by one or several instances of computer system 900. Similarly, the various elements of data center 200, such as nodes 210, computing systems 230, block storage service 265, local storage systems 292, and other functional units of data center 200 may be implemented by one or several instances of computer system 900.

In particular, it is noted that different elements of the system shown in FIG. 1 may be implemented by different computer systems 900. For example, virtualization module 160 may be implemented on one computer system 900 while virtual machines 200 may execute on a different computer system 900 under the control of virtualization module 160. Similarly, each of several nodes 210 and several computing systems 230 may be implemented by different computer systems 900 while each of block storage service 265 and computing systems 297 may also be implemented by different computer systems 900. In varying computing system embodiments, individual computing systems will be constructed that will omit various of the parts show in FIG. 9 and include others omitted in FIG. 9.

In the illustrated embodiment, computer system 900 includes one or more processors 910 coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 920 as code 925. It is noted that in some embodiments, code 925 may include instructions and data implementing desired functions that are not directly executable by processor 910 but are represented or encoded in an abstract form that is translatable to instructions that are directly executable by processor 910. For example, code 925 may include instructions specified in an ISA that may be emulated by processor 910, or by other code 925 executable on processor 910. Alternatively, code 925 may include instructions, procedures or statements implemented in an abstract programming language that may be compiled or interpreted in the course of execution. As non-limiting examples, code 925 may include code specified in a procedural or object-oriented programming language such as C or C++, a scripting language such as perl, a markup language such as HTML or XML, or any other suitable language.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to network 120, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 900 via I/O interface 930. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 900 as system memory 920 or another type of memory. A computer-accessible storage medium may generally be accessible via transmission media or signals such as electrical, electromagnetic, or digital signals, conveyed via a communication medium such as a network and/or a wireless link, such as may be implemented via network interface 940.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
  providing, by a block storage service, block-level storage to a plurality of distinct computing instances for a plurality of distinct users; and
  for each instance of one or more instances of the plurality of distinct computing instances:
    determining, by one or more processors, respective information about data being stored in the block storage service for a respective computing instance of the plurality of distinct computing instances;
    selecting, based at least in part on the respective information about data being stored in the block storage service, a block storage transaction enhancement that improves a data storage operation for the data being stored in the block storage service for the respective computing instance;
    performing, by the block storage service, the block storage transaction enhancement with respect to the data storage operation for the data being stored in the block storage service, wherein the block storage transaction enhancement is performed for an item of the data for multiple storage operations;
    measuring, by the one or more processors, an effectiveness of the selected block storage transaction enhancement; and
    responsive to determining that the effectiveness of the selected block storage transaction enhancement falls below a threshold, cancelling, by the one or more processors, the selected block storage transaction enhancement for the item of the data.

2. The method of claim 1, wherein the determining the respective information about the data being stored in the block storage service further comprises receiving, by the block storage service, an item of the respective information about the data being stored in the block storage service in a configuration request from a respective user of the plurality of distinct users through a service interface.

3. The method of claim 2, wherein said receiving the respective information about the data being stored in the block storage service further comprises receiving in a block data transaction instruction the information about the data being stored in the block storage service.

4. The method of claim 1, further comprising: monitoring metadata associated with one or more block data transaction instructions; and
  interpreting the metadata to determine the information about the data being stored in the block storage service, wherein the information about the data being stored in the block storage service includes a characteristic of a block data transaction instruction.

5. The method of claim 1, further comprising: monitoring metadata associated with one or more block data transaction instructions; and interpreting the metadata to determine the information about the data being stored in the block storage service, wherein the information about the data being stored in the block storage service includes a characteristic of a volume associated with the data.

6. The method of claim 1, wherein said performing, by the block storage service, the selected block storage transaction enhancement further comprises storing in a physically contiguous arrangement a series of data blocks associated with a logical data structure defined by a file system.

7. The method of claim 1, further comprising: determining an expected read pattern for the data being stored in the block storage service; wherein said performing, by the block storage service, the selected block storage transaction enhancement further comprises storing in a physically contiguous arrangement a series of data blocks predicted by the expected read pattern to be read consecutively.

8. The method of claim 1, further comprising: selecting a different block storage transaction enhancement by analyzing one or more block data transaction instructions and the effectiveness of the selected block storage transaction enhancement; and executing, by the block storage service, the different block storage transaction enhancement.

9. A system, comprising:
one or more computers configured to implement a block storage service, wherein the block storage service comprises:
a block-level storage for storing data from a plurality of distinct computing instances for a plurality of distinct users;
a service interface configured to receive, from users of the plurality of distinct users, one or more block data transaction instructions; and
a block storage enhancement function for:
determining, based on the one or more block data transaction instructions received via the service interface, information about the data being stored by the block storage service;
selecting, based on the information about the data being stored by the block storage service, one or more block storage enhancements that improve a data storage operation by the block-level storage to the data being stored by the block storage service;
performing the one or more block storage enhancements with respect to the data storage operation on the data being stored by the block storage service, wherein the one or more block storage enhancements are performed for an item of the data for multiple storage operations;
measuring an effectiveness of the one or more selected block storage enhancements; and
responsive to determining that the effectiveness of the one or more selected block storage enhancements fall below a threshold, cancelling the one or more selected block storage enhancements for the item of the data.

10. The system of claim 9, wherein the block storage enhancement function further comprises a function for determining the information about the data being stored by the block storage service based on: volume formats of respective ones of one or more volumes in the block storage service, or content of selected ones of the one or more block data transaction instructions received by the block storage service for the respective ones of the one or more volumes in the block storage service.

11. The system of claim 10, wherein: said service interface configured to receive the one or more block data transaction instructions further comprises a configuration interface configured to receive a configuration request from one of the plurality of distinct users indicating a purpose of one of the one or more volumes in the block storage service that is associated with one of the plurality of distinct computing instances; and said information includes the purpose of the one of the one or more volumes.

12. The system of claim 9, further comprising an application programming interface for extracting from the one or more block data transaction instructions one or more block storage data characterizations embedded by one or more of a plurality of operating systems associated with respective ones of the plurality of distinct computing instances.

13. The system of claim 9, further comprising a read prediction function for determining expected read patterns based on the information about the data being stored by the block storage service.

14. The system of claim 13, further comprising a cache memory for storing data blocks read from one or more volumes in the block storage service in response to having been determined, based on the expected read patterns, to be a likely future read by one of the plurality of distinct computing instances.

15. The system of claim 13, further comprising a cache memory for storing data blocks written to the block storage service and having been determined, based on the expected read patterns, to be a likely future read by one of the plurality of distinct computing instances.

16. The system of claim 9, further comprising a storage encryption function for, based on the information about the data being stored by the block storage service, encrypting and storing data blocks written to one or more volumes in the block storage service.

17. The system of claim 9, further comprising a storage compression function for, based on the information about the data being stored by the block storage service, compressing and storing data blocks written to one or more volumes in the block storage service.

18. The system of claim 9, further comprising: a plurality of independent storage units; a storage replication function for, based on the information about the data being stored by the block storage service, storing on each independent storage unit of the plurality of independent storage units a copy of one or more data blocks expected to be a subject of frequently repeated read requests by one of the plurality of distinct computing instances.

* * * * *